Patented Nov. 3, 1953

2,658,024

UNITED STATES PATENT OFFICE 2,658,024

METHOD FOR PRODUCTION OF PRODIGIOSIN

Roger L. Harned, Terre Haute, Ind., assignor to Commercial Solvents Corporation, Terre Haute, Ind., a corporation of Maryland No Drawing. Application April 26, 1951, Serial No. 223,158

10 Claims. (Cl. 195—96)

My invention relates to the antibiotic prodigiosin and more particularly it relates to a method for the production of prodigiosin by submerged fermentation of a suitable nutrient medium by the organism *Serratia marcescens*.

Prodigiosin is a thermo-stable red pigment produced in nutrient media by the organism *Serratia marcescens*. Although prodigiosin has been known for a number of years, the antibiotic properties of the material were not recognized until Hettche (Arch. Hyg., 107, 348) first reported its bacteriostatic activity against Staphylococci and *Bacillus anthracis* in vitro in 1932. Since that time it has been the subject of considerable study and the structure of the material has been identified as a tripyrryl methene. As an antibiotic, prodigiosin is active against Gram-positive organisms but is essentially inactive against Gram-negative organisms. It also has been found to possess antifungal activity and to be fungistatic against the organism *Coccidioides immitis* which causes coccidioido-mycosis or San Joaquin Valley fever.

The antibiotic prodigiosin is produced by and is contained within the cells of the organism *Serratia marcescens* when the organism is grown in nutrient media. In the past, prodigiosin has been produced almost entirely by surface culture on expensive experimental media containing such ingredients as agar, meat extract, brewer's yeast, commercial peptone mixtures, etc. Such media have been used for the production of prodigiosin for experimental purposes and they are productive of only small yields of the antibiotic. An inexpensive medium capable of producing high yields of the antibiotic has been highly desired by the art.

I have now discovered a process for the production of prodigiosin by submerged fermentation which utilizes an inexpensive nutrient medium and is capable of producing greatly increased yields of the antibiotic over that previously obtained by the prior art. By employing my new process I am able to obtain markedly increased quantities of the antibiotic at a greatly reduced cost and in addition the use of my new process for the production of the antibiotic facilitates subsequent recovery of the antibiotic from the medium in which it is produced. Prodigiosin can be recovered from the media in which it is produced by the method described in copending Serial No. 196,711 by Urs F. Nager entitled "Method for the Recovery of Prodigiosin."

My new process consists primarily of the submerged cultivation of the organism *Serratia marcescens* in an aerated, agitated nutrient medium which is more particularly described hereinafter. Surface cultivation of the organism *Serratia marcescens* on my new medium can be conducted but quantity production of the antibiotic is severely limited when such a procedure is employed.

The organism *Serratia marcescens* is productive of a number of bacterial variants as described by D. B. Reed in the Journal of Bacteriology 34, 255. In producing prodigiosin according to my process, I prefer to employ a nonmucoid, rough strain of the organism because this type strain does not produce the large quantities of mucilaginous slime produced by the mucoid type strains and therefore filtration of the medium following fermentation is greatly facilitated, this operation being practically impossible following use of a mucoid type strain of the organism.

The nutrient medium which I employ in the production of prodigiosin is composed of a carbohydrate-like material, a protein, and a salt. The carbohydrate-like materials which I can use in my medium are the hexose alcohols such as mannitol, dulcitol and sorbitol. The protein which I employ is any of a number of proteinaceous soy products such as soy flour, soy grits, soybean expeller meal, solvent extracted soybean meal, etc. The salt which I employ in my new medium is magnesium sulfate.

In compounding my new medium, I add from about 1 to about 3% of the hexose alcohol, from about 0.5 to about 1.5% of the proteinaceous soy product and from about 0.1 to about 0.25% magnesium sulfate to a water base made up to the desired volume. I then adjust the pH of the medium to a value between about 4.5 and 8, preferably about 5.0, with a suitable acid such as for example hydrochloric acid. My preferred medium consists of about 3% of the hexose alcohol, about 1.5% of the soy product, and about 0.125% magnesium sulfate.

Following preparation of my new medium, I inoculate it with a culture of the organism *Serratia marcescens* using a strain such as that described above. The medium is then allowed to ferment and during fermentation air is supplied to the medium at a rate ranging from about 0.5 to about 1.0 volume of air per volume of medium per minute. The medium is preferably agitated during the fermentation since agitated media give higher yields of prodigiosin than the nonagitated media although, of course, prodigiosin can be produced with fair success in non-agitated media. In carrying out the fermentation I can employ temperatures ranging from about 25 to about 35° C. although I prefer to use a temperature of about 28° C. It should be noted that the agitated media tend to foam during the fermentation and therefore I have found it advantageous to add an anti-foam agent to the medium to counteract this tendency. Any of the usual anti-foam agents such as for example octadecanol, corn oil, substituted oxazolines, etc., can be used, one qualification of the anti-foam agent being inertness toward prodigiosin.

The following examples are offered to illustrate my invention but it is to be understood that I do not intend to be limited to the specific amounts, proportions, substances, and procedures shown therein.

EXAMPLE I

A 1200 gallon portion of a medium consisting of 3% sorbital, 1.5% soy flour, and 0.125% magnesium sulfate was placed in a 2,000 gallon stainless steel fermenter provided with agitator. The fermenter was inoculated with a rough, non-mucoid strain of the organism *Serratia marcescens* developed as follows: an agar slant culture of the organism was washed with 10 ml. of sterile saline solution into one liter of sterile inoculum medium consisting of 1% peptone, 1% sorbitol, and 0.125% magnesium sulfate, the pH having been adjusted to 5.0 with hydrochloric acid, in a 4 liter flask, and incubated for 16 hours with reciprocal shaking at 28° C. The contents of the flask were then transferred to 30 gallons of the regular fermentation medium in a 100 gallon non-agitated tank and grown for 16 hours at 28 C., air being supplied at the rate of ½ volume of air per volume of medium per minute. The contents of the tank were then transferred to the medium in the fermenter whereupon fermentation was carried out at a temperature of 28 C., air being supplied to the fermenter at a rate of ½ volume of air per volume of medium per minute. The anti-foam agent used was 0.25% of a 3% solution of octadecanol in mineral oil. The following table shows the results of the fermentation through 35 hours at which point the prodigiosin was recovered.

Table I

| Sample No. | Age, hours | Milligrams prodigiosin hydrochloride per liter |
|---|---|---|
| 1 | 7 | 0 |
| 2 | 16 | 143 |
| 3 | 19 | 253 |
| 4 | 24 | 506 |
| 5 | 27 | 570 |
| 6 | 31 | 574 |
| 7 | 35 | 574 |

EXAMPLE II

A 50 gallon portion of a medium consisting of 3% sorbitol, 1.5% soy flour, and 0.125% magnesium sulfate was placed in each of two 100 gallon stainless steel tanks. The tanks were then inoculated with an agar slant culture of a rough, non-mucoid strain of *Serratia marcescens*, washed with 10 ml. of sterile saline into 1 liter of sterile inoculum medium consisting of 1% peptone, 1% sorbitol, and 0.125% magnesium sulfate, the pH having been adjusted to 5.0 with hydrochloric acid, in a 4 liter flask, and incubated for 16 hours with reciprocal shaking at 28° C. Aeration was supplied to the medium at the rate of 1 volume of air per volume of medium per minute and the fermentation carried out at 28° C. The anti-foam agent used was 0.25% of a 3% solution of octadecanol in mineral oil. One of the fermenters was agitated and one was not. The results are shown in the following table.

Table II

| Sample No. | Age, hours | Agitated fermenter, mg. prodigiosin hydrochloride per liter | Nonagitated fermenter, mg. prodigiosin hydrochloride per liter |
|---|---|---|---|
| 1 | 7 | 0 | 0 |
| 2 | 13 | 77 | |
| 3 | 19 | 284 | |
| 4 | 24 | 394 | 285 |
| 5 | 31 | 410 | |
| 6 | 37 | 636 | 310 |
| 7 | 43 | 680 | 344 |
| 8 | 48 | 720 | 474 |

EXAMPLE III

A series of experiments was conducted in 10 liter jars wherein a 1200 ml. portion of a medium consisting of 3% sorbitol, 1.5% soy flour, and 0.125% magnesium sulfate was placed in each jar. The pH was not adjusted. The jars were then inoculated with a non-mucoid rough strain of the organism *Serratia marcescens* and the medium fermented for 48 hours at a temperature of 28° C. Aeration was at the rate of 1 volume of air per volume of medium per minute. The results are shown in the following table.

Table III

| Jar | Micrograms prodigiosin hydrochloride per milliliter | | |
|---|---|---|---|
| | 24 hrs. | 30 hrs. | 48 hrs. |
| 1 | 400 | 494 | 600 |
| 2 | 366 | 446 | 530 |
| 3 | 410 | 466 | 620 |
| 4 | 354 | 444 | 530 |
| 5 | 366 | 426 | 530 |
| 6 | 376 | 426 | 535 |

EXAMPLE IV

The following series of experiments shows various media compositions and their effect on the yield of prodigiosin. The experiments were carried out in 1 liter Erlenmeyer flasks containing 200 ml. of medium of the composition shown to each of which was added 0.125% magnesium sulfate. The pH of all the flasks was adjusted to 5.0 with hydrochloric acid. Fermentation was conducted on a reciprocal shaker at a temperature of 28° C. Each flask was inoculated with a non-mucoid rough strain of the organism *Serratia marcescens* developed for 16 hours at 28° C. in a medium consisting of 1% sorbitol and 1% peptone. The following table shows the results of the series of experiments.

Table IV

| Flask | Medium | Micrograms prodigiosin hydrochloride per milliliter | | |
|---|---|---|---|---|
| | | 24 hrs. | 30 hrs. | 48 hrs. |
| 5 | 1% sorbitol, ½% soy flour | 88 | 110 | 160 |
| 6 | do | 100 | 115 | 160 |
| 1 | 1% sorbitol, 1% soy flour | 107 | 177 | 250 |
| 2 | do | 150 | 200 | 230 |
| 3 | 2% sorbitol, 1% soy flour | 145 | 197 | 286 |
| 4 | do | 172 | 195 | 276 |
| 7 | 3% sorbitol, 1½% soy flour | 260 | 213 | 330 |

EXAMPLE V

The following series of experiments was conducted using 1% mannitol as the carbohydrate along with 1% soy grits and 0.125% magnesium sulfate with the pH adjusted to 5.5 with hydrochloric acid. One liter Erlenmeyer flasks each containing 200 ml. of the medium were employed, the medium being inoculated with a non-mucoid rough strain of the organism *Serratia marcescens*. Fermentation was carried out on reciprocal shakers at a temperature of 28° C. The following table shows the results obtained.

Table V

| Flask | Micrograms prodigiosin hydrochloride per milliliter | | |
|---|---|---|---|
| | 16 hrs. | 30 hrs. | 54 hrs. |
| 6 | 38 | 190 | 150 |
| 7 | 24 | 275 | 287 |
| 8 | 22 | 220 | 263 |
| 9 | 30 | 310 | 325 |
| 10 | 30 | 285 | 310 |

The scope of my invention is outlined in this specification and the attached claims and I intend for all equivalents and variations apparent to one skilled in the art to be specifically included herein.

What I claim is:

1. A process for the production of prodigiosin which comprises inoculating with an active culture of *Serratia marcescens* an aerated nutrient medium containing a hexose alcohol selected from the group consisting of sorbitol, mannitol, and dulcitol, a proteinaceous soy product, and magnesium sulfate, allowing the medium to ferment at a temperature favorable for prodigiosin production and growth of the organism until the desired prodigiosin concentration has been obtained.

2. A process for the production of prodigiosin which comprises growing a prodigiosin producing strain of *Serratia marcescens* in an aerated nutrient medium containing a hexose alcohol selected from the group consisting of sorbitol, mannitol, and dulcitol, a proteinaceous soy product, and magnesium sulfate and isolating the prodigiosin thus produced.

3. A process for the production of prodigiosin which comprises growing a prodigiosin producing strain of *Serratia marcescens* in an aerated, agitated nutrient medium containing a hexose alcohol selected from the group consisting of dulcitol, sorbitol and mannitol, a proteinaceous soy product, and magnesium sulfate and isolating the prodigiosin thus produced.

4. A process for the production of prodigiosin which comprises growing a prodigiosin producing strain of *Serratia marcescens* in an aerated, agitated nutrient medium containing a hexose alcohol selected from the group consisting of dulcitol, sorbitol and mannitol, soy flour and magnesium sulfate and isolating the prodigiosin thus produced.

5. A process for the production of prodigiosin which comprises growing a prodigiosin producing strain of *Serratia marcescens* in an aerated, agitated nutrient medium containing from about 1 to about 3% of a hexose alcohol selected from the group consisting of sorbitol, mannitol, and dulcitol, from about 0.5 to about 1.5% of a proteinaceous soy product, and from about 0.1 to about 0.25% magnesium sulfate and isolating the prodigiosin thus produced.

6. A process for the production of prodigiosin which comprises growing a prodigiosin producing strain of *Serratia marcescens* in an agitated, aerated nutrient medium containing a hexose alcohol selected from the group consisting of dulcitol, sorbitol and mannitol, a proteinaceous soy product, and magnesium sulfate, the pH of the medium being adjusted to a value between about 4.5 and 8.0 and isolating the prodigiosin thus produced.

7. A process for the production of prodigiosin which comprises growing a prodigiosin producing strain of *Serratia marcescens* in an agitated nutrient medium containing a hexose alcohol selected from the group consisting of dulcitol, sorbitol and mannitol, a proteinaceous soy product, and magnesium sulfate said medium being aerated at a rate between about 0.5 and 1.0 volume of air per volume of medium per minute and isolating the prodigiosin thus produced.

8. A process for the production of prodigiosin which comprises growing a non-mucoid, rough, prodigiosin producing strain of *Serratia marcescens* in an aerated, agitated nutrient medium containing a hexose alcohol selected from the group consisting of dulcitol, sorbitol and mannitol, a proteinaceous soy product, and magnesium sulfate and isolating the prodigiosin thus produced.

9. A process for the production of prodigiosin which comprises growing a non-mucoid, rough, prodigiosin producing strain of *Serratia marcescens* in an agitated nutrient medium containing sorbitol, soy flour, and magnesium sulfate, and isolating the prodigiosin thus produced.

10. A process for the production of prodigiosin which comprises growing a non-mucoid, rough, prodigiosin producing strain of the organism *Serratia marcescens* in an agitated nutrient medium containing 3% sorbitol, 1.5% soy flour, and 0.125% magnesium sulfate, the pH of the medium being adjusted to 5.0 with hydrochloric acid, and said medium being aerated at a rate of 1 volume of air per volume of medium per minute and isolating the prodigiosin thus produced.

ROGER L. HARNED.

References Cited in the file of this patent

UNITED STATES PATENTS

| Number | Name | Date |
|---|---|---|
| 2,498,165 | Johnson | Feb. 21, 1950 |
| 2,567,698 | Darker | Sept. 11, 1951 |
| 2,586,762 | Finlay et al. | Feb. 19, 1952 |

OTHER REFERENCES

Florey: Antibiotics, vol. I, pages 558–562, RS-161–A55.

Baron: Handbook of Antibiotics, 1950, Reinhold Pub. Corp., pages 8 to 11. RS–161–B3, Sci. Lib.

Wier et al.: "A Clinical Trial of Prodigiosin in Disseminated Coccidioidomycosis," Am. Jour. of the Medical Sciences, volume 224, pages 70–76.